United States Patent
Munson

(10) Patent No.: US 6,517,716 B2
(45) Date of Patent: Feb. 11, 2003

(54) SEALING MEANS FOR FILTER ENVELOPES

(75) Inventor: James R. Munson, Neshanic Station, NJ (US)

(73) Assignee: The Dallas Group of America, Inc., Whitehouse, NJ (US)

( * ) Notice: Subject to any disclaimer, the term of this patent is extended or adjusted under 35 U.S.C. 154(b) by 37 days.

(21) Appl. No.: 09/764,921

(22) Filed: Jan. 18, 2001

(65) Prior Publication Data

US 2001/0050251 A1 Dec. 13, 2001

Related U.S. Application Data

(60) Provisional application No. 60/177,295, filed on Jan. 21, 2000.

(51) Int. Cl.⁷ .......................... B01D 35/00; B01D 35/14; B01D 35/143; B01D 35/153
(52) U.S. Cl. ........................ 210/232; 210/249; 210/486; 210/DIG. 8
(58) Field of Search .................................. 210/232, 249, 210/486, DIG. 8; 223/90, 91, 93, 96; 248/229.16, 229.26, 316.7

(56) References Cited

U.S. PATENT DOCUMENTS

| 223,681 A | * | 1/1880 | Reinhardt |
| 3,159,095 A | * | 12/1964 | Wagner |

* cited by examiner

*Primary Examiner*—Matthew O. Savage
(74) *Attorney, Agent, or Firm*—Elliot M. Olstein; Raymond J. Lillie

(57) ABSTRACT

A sealing means for sealing a filter envelope of a filter apparatus which includes at least one clip for sealing the filter envelope, and at least one connecting means extending from the filter apparatus to the at least one clip. Such a sealing means prevents the accidental discarding of clips for sealing filter envelopes.

6 Claims, 2 Drawing Sheets

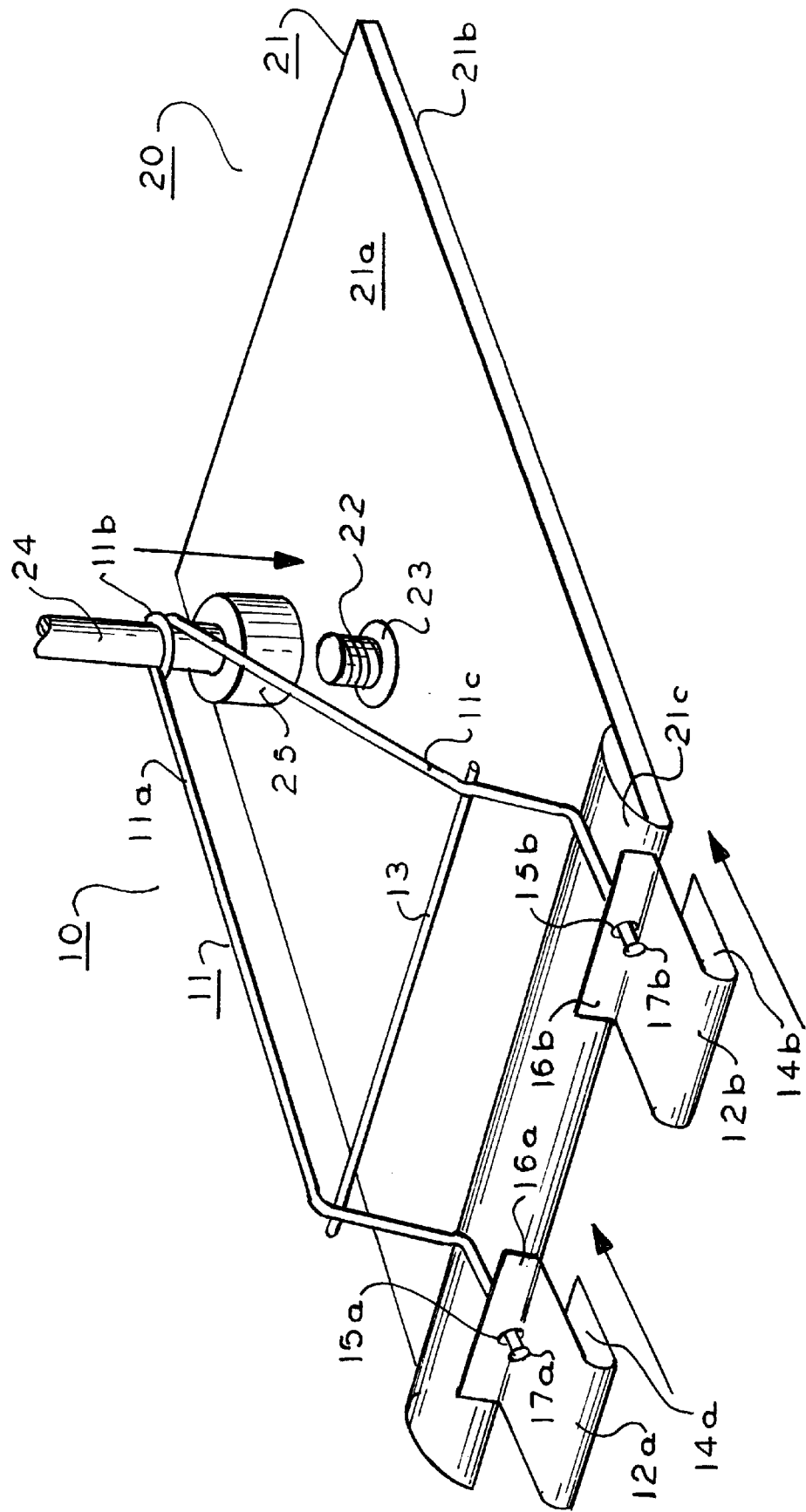

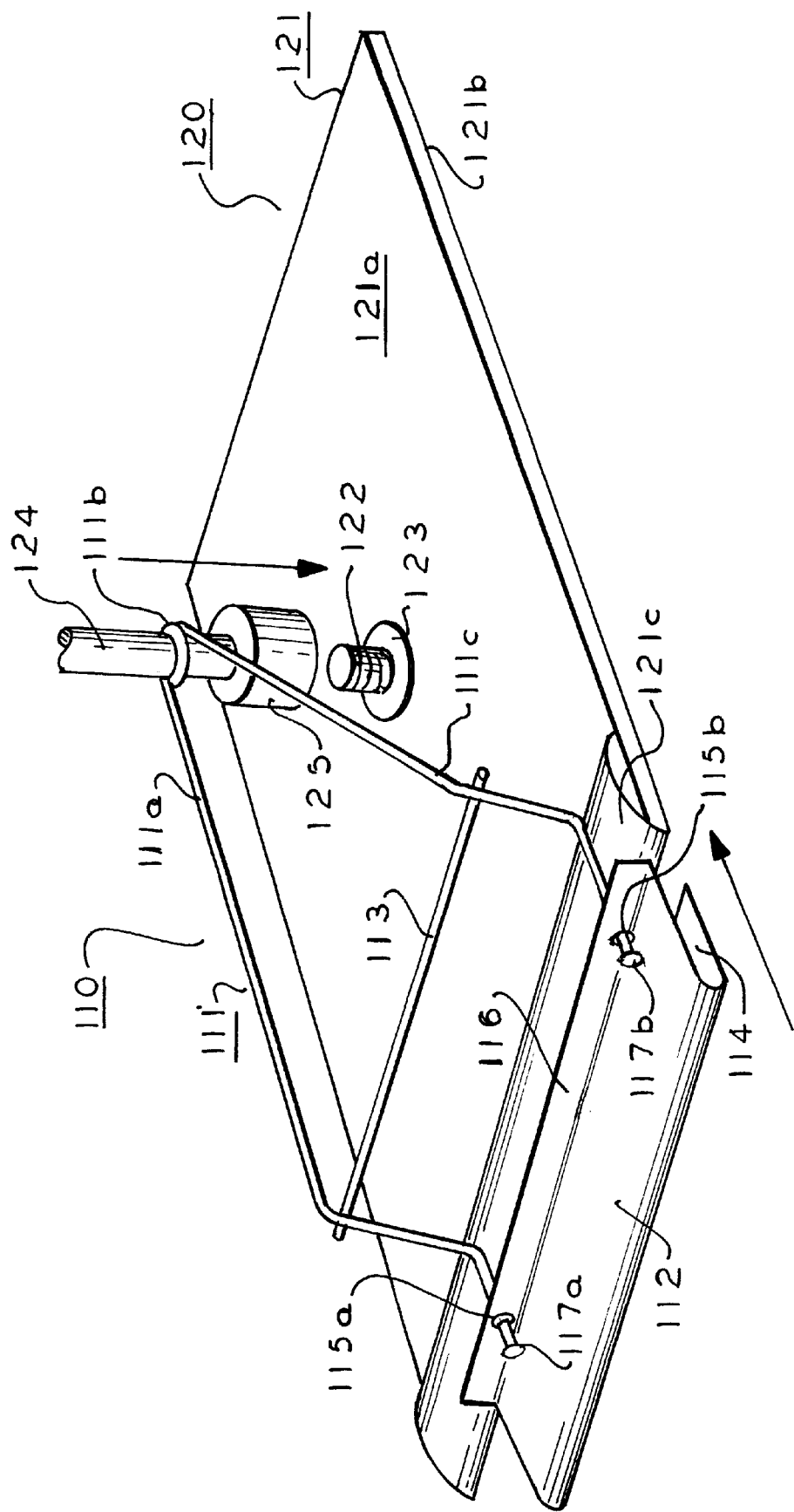

SEALING MEANS FOR FILTER ENVELOPES

The application claims priority based on, and is a continuation-in-part of, provisional application Serial No. 60/177,295, filed Jan. 21, 2000.

This invention relates to sealing means for filter envelopes, such as those employed in treating used cooking oil. More particularly, this invention relates to a sealing means for filter envelopes wherein the sealing means is attached to the filter apparatus.

In a typical frying operation, large quantities of edible cooking oils or fats are heated in pans or vats to temperatures of from about 315° F. to about 400° F. or more and the food is immersed in the oil or fat for cooking. During repeated use of the cooking oil or fat, the high cooking temperatures, in combination with water from the food being fried, cause the formation of free fatty acids (or FFA). An increase in the FFA decreases the oil's smoke point and results in increasing smoke as the oil ages. In addition, the cooking oil may include solid impurities, such as, for example, small pieces of the food being cooked.

In addition to hydrolysis, which forms free fatty acids, there occurs oxidative degeneration of fats which results from contact of air with hot oil, thereby producing oxidized fatty acids (or OFA). Heating transforms the oxidized fatty acids into secondary and tertiary by-products which may cause off-flavors and off-odors in the oil and fried food.

Caramelization also occurs during the use of oil over a period of time, resulting in a very dark color of the oil, which, combined with other by-products, produces dark and unappealing fried foods.

Such solid and dissolved impurities in general are removed from such used cooling oils by passing such oils through a filter. Such a filter includes one or more of the following components including, but not limited to, screens, metal spacer grids, filter papers, filter pads, or combinations thereof. In connection with the filter, the oil may be contacted with a variety of materials of filter aids, adsorbents, or neutralizing agents, generally in the form of powders or particles, to remove free fatty acids, oxidized fatty acids, and other by-products from the oil. Such materials include, but are not limited to, magnesium silicate, diatomite, calcium silicate, and alkali materials such as alkaline earth metal hydroxides, alkaline earth metal oxides, alkali metal carbonates, alkali metal bicarbonates, alkaline earth metal carbonates, and alkali metal silicates. Such materials may be placed upon the filter or contained within the filter. For example, when a filter pad or filter paper is employed, such materials may be impregnated in the filter pad or filter paper.

One example of a filter includes a metal spacer grid which is contained within a filter paper envelope or a filter pad envelope. The paper or pad envelope may be impregnated with a filter aid, such as those hereinabove described. Such a filter in general is disposed at the bottom of a pan of used cooking oil. The metal spacer grid has a fitting which extends from the grid through a panel of side of the filter envelope. The fitting may be connected to a pipe which is connected to a pump. When the pump is activated, the oil flows through the paper envelope on both side of the filter, through the interstices of the metal spacer grid, and through the metal fitting and pipe. The filtered oil then may be recycled for further cooking.

The filter envelope has an opening which, in general is sealed with a sealing clip. The clip, in general, is necessary for proper operation of the filter apparatus because, without the clip, food particles can bypass the filter paper or filter pad and enter the open end of the filter envelope. The sealing clips, however, are not attached to the filter apparatus. As a result, the clips often are lost or discarded accidentally by the user.

It is therefore an object of the present invention to provide a sealing means for a filter envelope wherein the sealing means is attached to the filter apparatus.

Thus, in accordance with an aspect of the present invention, there is provided a sealing means for sealing a filter envelope of a filter apparatus. The sealing means includes at least one clip means for sealing the filter envelope, and at least one connecting means extending from the filter apparatus to the at least one clip means.

In one embodiment, the connecting means includes a loop portion attached to the filter apparatus, and at least one leg portion extending from the loop portion to the at least one clip means. In a preferred embodiment, the sealing means includes at least two clips, and the connecting means includes a loop portion and two leg portions. Each of the leg portions extends from the loop portion to a clip. In a more preferred embodiment, the sealing means includes two clips and the connecting means is a wire. Each of the two clips includes a channel portion and a flange portion. The channel portion is capable of receiving the filter envelope, whereby the clip seals the filter envelope. The flange portion of each clip includes an opening for receiving a leg of the wire, whereby the clip is connected to the wire. The wire includes a loop portion, which in general surrounds a pipe or conduit of the filter apparatus. Extending from the loop portion are two legs of the wire. Each leg of the wire passes through the opening in the flange of one of the clips, whereby each of the clips is attached to the wire. Preferably, a stabilizing bar is welded to each leg of the wire such that the acute angle formed by the legs of the wire is maintained. The legs of the wire and the stabilizing bar form an isosceles triangle. Thus, Applicant has provided a means for sealing a filter envelope in which the sealing portion will not be discarded accidentally.

In another embodiment, the connecting means includes a loop portion attached to the filter apparatus, and at least one leg portion extending from the loop portion to one clip means. In a preferred embodiment, the sealing means includes a clip, and the connecting means includes a loop portion and two leg portions. Each of the leg portions extends from the loop portion to an end of the clip. In a more preferred embodiment, the sealing means includes one clip and the connecting means is a wire. The clip includes a channel portion and a flange portion. The channel portion is capable of receiving the filter envelope, whereby the clip seals the filter envelope. The flange portion has two openings located proximal to opposite ends of the clip. Each opening receives a leg of the wire, whereby the clip is connected to the wire. The wire includes a loop portion, which in general surrounds a pipe or conduit of the filter apparatus. Extending from the loop portion are two legs of the wire. Each leg of the wire passes through an opening in the flange at one end of the clip, whereby the clip is attached to the wire. Preferably, a stabilizing bar is welded to each leg of the wire such that the acute angle formed by legs of the wire is maintained. The legs of the wire and the stabilizing bar form a isosceles triangle.

The invention now will be described with respect to the drawings, wherein:

FIG. 1 is an isometric view of an embodiment of the sealing means as it is attached to a filter apparatus and is used to seal a filter envelope, wherein the sealing means includes two clips; and FIG. 2 is an isometric view of another embodiment of the sealing means which includes one clip.

Referring now to FIG. 1, the sealing means 10 includes a connecting means in the form of wire 11 which includes leg 11a, loop 11b, and leg 11c, and clips 12 and 12b. Clip 12a includes a U-shaped channel portion 14a, and a flange portion 16a which includes an opening 15a. Clip 12b includes a U-shaped channel portion 14b and flange portion 16b which includes an opening 15b. At the end of leg 11a is a flange 17a which has a diameter greater than that of opening 15a, and at the end of leg 11c is a flange 17b which has a diameter greater than that of opening 15b. Flanges 17a and 17b prevent the wire 11 from being separated from clips 12a and 12b.

Legs 11a and 11c are disposed at an acute angle to, and extend outwardly from loop 11b. Bar 13 is welded to legs 11a and 11c of wire 11 so as to maintain the stability of the acute angle at which legs 11a and 11c are disposed with respect to loop 11b. Thus, in effect, legs 11a and 11c, and bar 13 form an isosceles triangle.

The filter apparatus 20 includes a filter envelope 21 which encloses a metal filter grid (not shown). The filter envelope includes a top filter panel 21a which is disposed over the top of the filter grid, a bottom filter panel 21b which is disposed under the bottom of the filter grid, and a filter flap 21c which extends upwardly from the bottom filter panel 21b and over filter panel 21a in order to cover the open area where top filter panel 21a and bottom filter panel 21b are not attached to each other. Top filter panel 21a, bottom filter panel 21b, and filter flap 21c may be of the same material, or may be of different materials having different permeabilities. For example, one of the top and bottom filter panels may be a filter pad, and the other of the top and bottom panels may be filter paper. Top filter panel 21 has an opening 23 through which extends upwardly a nipple 22. Nipple 22 may be connected to conduit 24 by means of connector 25. Conduit 24 may be connected to a means, such as a vacuum pump (not shown), for drawing used cooking oil through filter envelope 21, nipple 22, and conduit 24, back to a cooking apparatus such as a fryer (not shown).

The sealing means 10 is attached to the filter 20 first by inserting conduit 24 through loop 11b of wire 11. Connector 25 then is screwed onto nipple 22 to connect nipple 22 with conduit 24. Once nipple 22 is connected with conduit 24, clip 12a is pushed toward flap 21c of filter envelope 21, such that flap 21c of filter envelope 21, which encloses a filter grid, is fitted within channel 14a of clip 12a. Leg 11a of wire 11 is extended through opening 15a of flange 16a. Flange 17a at the end of leg 11a, which is wider than opening 15a in flange 16a, prevents clip 12a from being separated from wire 11. Also, clip 12b is pushed toward flap 21c of filter envelope 21 such that flap 21c also is fitted within channel 14b of clip 12b. Leg 11c of wire 11 is extended through opening 15b of flange 16b. Flange 17b at the end of leg 11c, which is wider than opening 15b in flange 16b, prevents clip 12b from being separated from wire 11. In this manner, the sealing means 10 closes the filter envelope 21 while being attached to filter 20.

In another embodiment, as shown in FIG. 2, the sealing means 110 includes a connecting means in the form of wire 111 which includes leg 111a, loop 111b, and leg 111c, and clip 112. Clip 112 includes a U-shaped channel portion 114, and a flange portion 116 which includes openings 115a and 115b. At the end of leg 111a is a flange 117a which has a diameter greater than that of opening 115a, and at the end of leg 111c is a flange 117b which has a diameter greater than that of opening 115b. Flanges 117a and 117b prevent the wire 111 from being separated from clip 112.

Legs 111a and 111c are disposed at an acute angle to, and extend outwardly from loop 111b. Bar 113 is welded to legs 111a and 111c of wire 111 so as to maintain the stability of the acute angle at which legs 111a and 111c are disposed with respect to loop 111b. Thus, in effect, legs 111a and 111c and bar 113 form an isosceles triangle.

The filter apparatus 120 includes a filter envelope 121 which encloses a metal filter grid (not shown). The filter envelope 121 includes a top filter panel 121a which is disposed over the top of the filter grid, a bottom filter panel 121b which is disposed under the bottom of the filter grid, and a filter flap 121c which extends upwardly from the bottom filter panel 121b and over top filter panel 121a in order to cover the open area where top filter panel 121a and bottom filter panel 121b are not attached to each other. Top filter panel 121a, bottom filter panel 121b and filter flap 121c may be of the same material, or may be of different materials having different permeabilities. For example, one of the top and bottom filter panels may be a filter pad, and the other of the top and bottom panels may be a filter paper. Top filter panel 121 has an opening 123 through which extends upwardly a nipple 122. Nipple 122 may be connected to conduit 124 by means of connector 125. Conduit 124 may be connected to a means, such as a vacuum pump (not shown), for drawing used cooking oil through filter envelope 121, nipple 122, and conduit 124, back to a cooking apparatus such as a fryer (not shown).

The sealing means 110 is attached to the filter 120 first by inserting conduit 124 through loop 111b of write 111. Connector 125 then is screwed onto nipple 122 to connect nipple 122 with conduit 124. Once nipple 122 is connected with conduit 124, clip 112 is pushed toward flap 121c of filter envelope 121, such that flap 121c of filter envelope 121, which encloses a filter grid, is fitted within channel 114 of clip 112. Leg 111a of wire 111 is extended through opening 115a of flange 116. Flange 117a at the end of leg 111a, which is wider than opening 115 in flange 116 prevents clip 112 from being separated from wire 111. Leg 111c of wire 111 is extended through opening 115b of flange 116. Flange 117b at the end of leg 111c, which is wider than opening 115b in flange 116 also prevents clip 112 from being separated from wire 111. In this manner, the sealing means 110 closes the filter envelope 121 while being attached to filter 120.

It is to be understood, however, that the scope of the present invention is not to be limited to the specific embodiments described above. The invention may be practiced other than as particularly described and still be within the scope of the accompanying claims.

What is claimed is:

1. A sealing means for sealing a filter envelope of a filter apparatus, comprising:
   (i) a wire including a loop portion capable of being attached to said filter apparatus and two leg portions, and (ii) two clips, wherein each of said leg portions of said wire extends from said loop portion to a clip, and wherein each of said two clips includes a channel portion and a flange portion, each said flange portion of each of said two clips including an opening for receiving a leg of said wire, and (iii) a stabilizing bar, said stabilizing bar being welded to each of said legs of said wire.

2. A sealing means for sealing a filter envelope of a filter apparatus, comprising:
   (i) a connecting means including a loop portion capable of being attached to said filter apparatus and two leg portions, and (ii) a clip, wherein each of said leg portion extends from said loop portion to an end of said clip.

3. The sealing means of claim 2 wherein said sealing means includes one clip and said connecting means is a wire.

4. The sealing means of claim 3 wherein said clip includes a channel portion and a flange portion.

5. The sealing means of claim 4 wherein said flange portion has two openings wherein said openings are located proximal to opposite ends of said clip.

6. The sealing means of claim 5, and further comprising a stabilizing bar, said stabilizing bar being welded to each of said legs of said wire.

* * * * *